United States Patent
Soumiya (10) Patent No.: US 7,218,606 B2
(45) Date of Patent: May 15, 2007

(54) TRANSMISSION SYSTEM AND TRANSMITTING DEVICE

(75) Inventor: Toshio Soumiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 979 days.

(21) Appl. No.: 10/095,801

(22) Filed: Mar. 12, 2002

(65) Prior Publication Data

US 2003/0039208 A1   Feb. 27, 2003

(30) Foreign Application Priority Data

Aug. 21, 2001   (JP)   ............................. 2001-249974

(51) Int. Cl.
*H04L 12/56*   (2006.01)
(52) U.S. Cl. ...................... 370/217; 370/225
(58) Field of Classification Search ...................... None
See application file for complete search history.

(56) References Cited

U.S. PATENT DOCUMENTS

| | | | |
|---|---|---|---|
| 6,895,441 B1* | 5/2005 | Shabtay et al. ............. | 709/238 |
| 6,940,853 B2* | 9/2005 | Yamada et al. ............. | 370/389 |
| 6,992,978 B1* | 1/2006 | Humblet et al. ............ | 370/228 |
| 2001/0007557 A1* | 7/2001 | Yamada et al. ............. | 370/389 |
| 2002/0004843 A1* | 1/2002 | Andersson et al. ......... | 709/238 |
| 2002/0083174 A1* | 6/2002 | Hayashi et al. ............ | 709/225 |
| 2002/0160811 A1* | 10/2002 | Jannette et al. ............ | 455/560 |

FOREIGN PATENT DOCUMENTS

JP   11-127196   5/1999

OTHER PUBLICATIONS

Terabit router, all-optical switch debut as meeting looks to thin protocol stack—Debate over Internet backbone heats up; Loring Wirbel ; Electronic Engineering Times , 1998 , n 1026, PG1 Publication Date: Sep. 21, 1998.*

Analysis and design of backbone architecture alternatives for IP optical networking; Baroni, S.; Publication Date: Oct. 2000 vol. 18, Issue: 10 On pp. 1980-1994.*

Fault Restoration Techniques for MPLS with QoS Constraints; Tae (Tom) Oh, Thomas M. Chen; Dept. of Electrical Engineering SMU.*

Simulator for MPLS path restoration and performance evaluation Ahn, G. Dept. of Comput. Eng., Chungnam Nat. Univ., Taejon ; Publication Date: 2001 On pp. 32-36.*

* cited by examiner

*Primary Examiner*—Hassan Kizou
*Assistant Examiner*—Salman Ahmed
(74) *Attorney, Agent, or Firm*—Katten Muchin Rosenman LLP (57) ABSTRACT

There is disclosed a transmitting system which is capable of recovering a fault efficiently, thereby improving transmission quality. When a fault has occurred, a fault message-sending section notifies a fault message including information of a detected location of occurrence of the fault to other devices. A relay/transfer section carries out label switching operation on a packet having a label added thereto and relay/transfer of the packet. The integer calculation section performs a function operation based on flow information of an input packet to calculate one integer corresponding to one input packet. A path-setting section classifies the calculated integer into one of sections divided by boundary values and sets the section as a path for transferring the input packet. Further, the path-setting section adjusts the boundary values, when a fault message is received, or depending on the state of communication. An ingress edge transfer device adds a label to a packet for transferring the packet via the set path.

3 Claims, 7 Drawing Sheets

TRANSMISSION SYSTEM AND TRANSMITTING DEVICE

BACKGROUND OF THE INVENTION

1. Field of the Invention

This invention relates to a transmission system and a transmitting device, and more particularly to a transmission system that carries out control operations for recovering a fault which has occurred, thereby performing transmission control, and a transmitting device for carrying out control operations for recovering a fault which has occurred, thereby performing transmission control.

2. Description of the Related Art

Recently, the traffic of IP (Internet Protocol) packets is increased along with the increasingly widespread use of the Internet. Further, the data contents of the IP packets are more diversified, and in addition to conventional computer data, data of sounds, motion pictures and the like requiring real time properties are increased.

In line with the above circumstances, to shorten a time period for transferring IP packets, a layer 2 label switching technology of adding an address label to each IP packet has been proposed.

The label switching technology is a high-speed packet transfer technology which is capable of realizing the layer 3 communication between different networks, which has been conventionally realized by using routers, by directly connecting the networks to each other in the layer 2 without using an upper layer. For the label switching technology, a method called MPLS (Multi-Protocol Label Switching) has been developed.

In MPLS, all control operations are carried out by IP (Internet Protocol), and a label with a fixed length is added to each IP packet to enable the IP packet to be transferred throughout a network by the label. The MPLS method is based on the concept of a label path, and is largely different in characteristics from the conventional IP in that it is connection-oriented.

The method of fault recovery control of MPLS includes a global repair method and a local repair method. The global repair method is a path-end switching method for recovering from a fault at path ends (at the inlet (ingress) and outlet (egress) of an MPLS network), while the local repair method is a fault-end switching method for switching a local path where a fault has occurred to another at the ends of the local path (between routers close to a link where the fault has occurred). When a line fault or the like has occurred, the above recovery control operations are carried out to set a route for recovering the fault, thereby recovering from the fault.

However, in the above-described conventional fault recovery control performed by the global repair method, when a path having a fault is switched to a path for recovering the fault, load applied to the fault recovering path after completion of the switching has not been considered at all.

Therefore, there is a fear that traffic loads are concentrated on the fault recovering path, which causes biased traffic and degraded operating efficiency of the system.

On the other hand, in the conventional fault recovery control performed by the local repair method, a route bypassing the local path in which a fault has occurred is searched for at an end of the local path, and then the packet is transferred to the route, i.e. a path for recovering the fault. This search processing takes much time, and hence hinders realization of efficient high-speed transfer.

SUMMARY OF THE INVENTION

The present invention has been made in view of these circumstances, and an object thereof is to provide a transmission system which is capable of recovering a fault efficiently, thereby improving transmission quality.

Further, another object of the invention is to provide a transmitting device which is capable of recovering a fault efficiently, thereby improving transmission quality.

To attain the above first object, there is provided a transmission system for carrying out control operations for recovering a fault, which has occurred, thereby performing transmission control.

This transmission system is characterized by comprises a core transfer device including fault message-notifying means for notifying, when a fault has occurred, a fault message including information of a location of occurrence of the fault to other devices, and relay/transfer means for carrying out label switching operation on a packet having a label added thereto, and relay/transfer of the packet, and an ingress edge transfer device including integer calculation means for performing a function operation based on flow information of an input packet to calculate one integer corresponding to one input packet, path-setting means for classifying the integer into one of sections of integers divided by boundary values to set the section as a path for transferring the input packet, and adjusting the boundary values when the fault message is received, or depending on the state of communication, and ingress edge transfer means for adding the label to the packet for transferring the packet via the set path.

To attain the above second object, there is provided a transmitting device for carrying out control operations for recovering a fault which has occurred, thereby performing transmission control.

The transmitting device is characterized by comprises fault detection means for detecting whether or not a fault has occurred in any of paths connected to the transmitting device, and setting flags indicative of results of the detection, label table management means for managing a table which is formed of working labels for input packets and working output paths corresponding to the respective working labels as well as protection labels and protection output paths corresponding to the respective protection labels, for fault recovery when a fault has occurred in any of the working output paths, and fault recovery means for replacing, when it is recognized from states of the flags that a fault has occurred in any of the working output paths, a working label for a packet with a protection label based on contents of the table, and transferring the packet via a corresponding one of the protection output paths.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
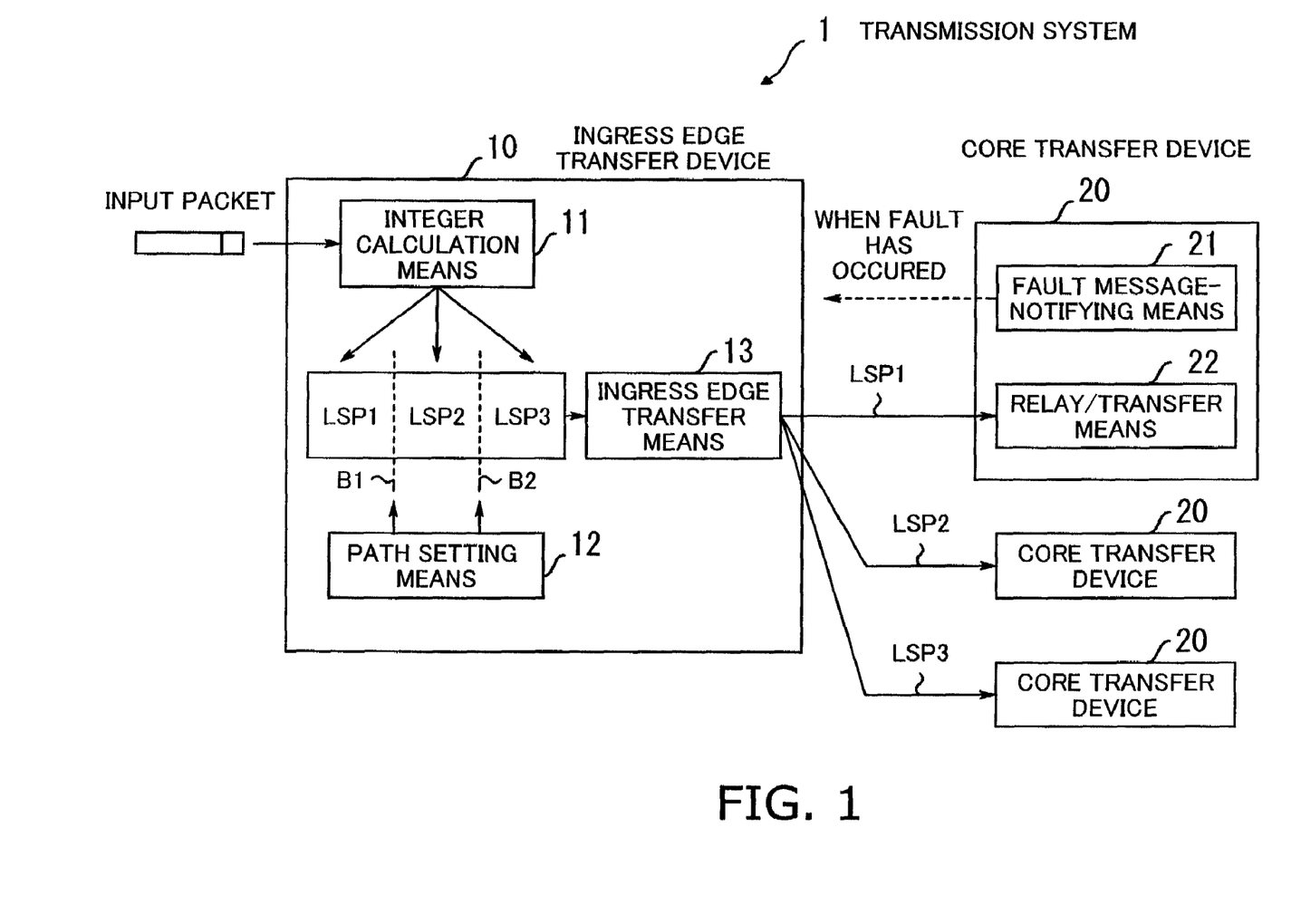
FIG. 1 is a block diagram illustrating the operating principles of a transmission system according to the invention.

The invention will now be described in detail with reference to drawings showing a preferred embodiment thereof. FIG. 1 is a block diagram illustrating the operating principles of a transmission system according to the present invention. The transmission system 1 is comprised of an ingress edge transfer device 10 and core transfer devices 20, and carries out control operations for recovering a fault which has occurred, thereby performing transmission control.

The core transfer devices 20 includes fault message-notifying means 21 and relay/transfer means 22. When there has occurred a fault, the fault message-notifying means 21 notifies a fault message including information of a detected location of occurrence of a fault to other devices (other core transfer devices and the ingress edge transfer device 10). The relay/transfer means 22, when receiving a packet with a label added thereto, carries out label switching operation for relay/transfer of the packet.

The ingress edge transfer device 10 includes integer calculation means 11, path-setting means 12, and ingress edge transfer means 13. The integer calculation means 11 performs a function operation based on flow information of the input packet to calculate one integer corresponding to one input packet. More specifically, the integer calculation means 11 performs an arithmetic operation by using a hash function to calculate one integer corresponding to one input packet.

The path-setting means 12 classifies the calculated integer into one of sections of integers divided by boundary values and sets the section into which the integer is classified as a path for transferring the input packet. In the figure, integers are classified into label paths LSP 1 to LSP 3 by using two boundary values B1, B2.

Further, the path-setting means 12 adjusts the above boundary values and resets the paths to avoid a fault, when a fault message is received, or depending on the state of communication. The ingress edge transfer means 13 adds a label to each packet for transferring the packet via one of the paths thus set.

Figure 2:
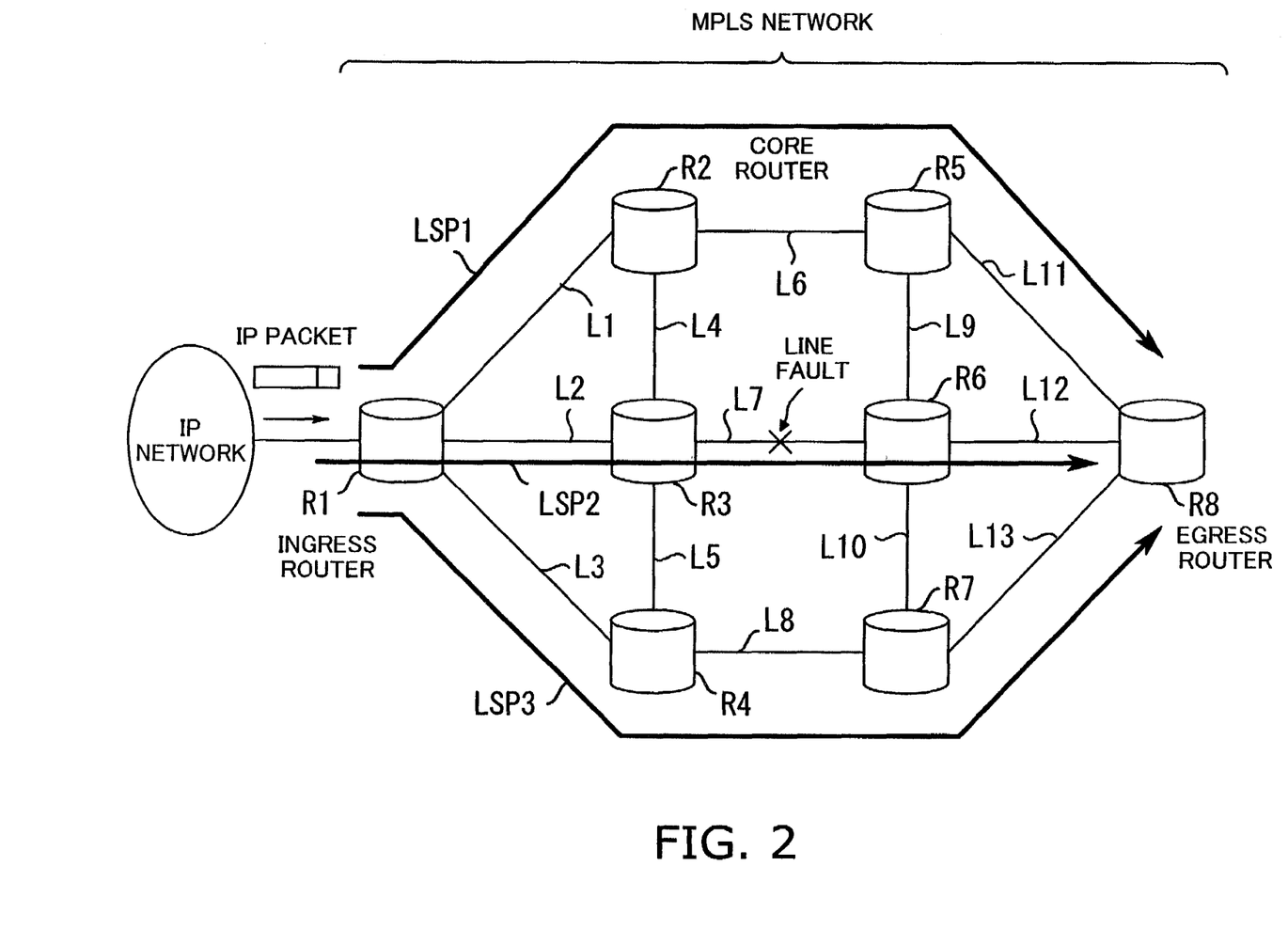
FIG. 2 is a block diagram showing an example of the network configuration of the transmission system.

Next, an application of the transfer system 1 according to the invention to the global repair method of MPLS will be described with reference to FIGS. 2 to 4. FIG. 2 shows an example of the network configuration of the transmission system 1.

The connection of routers of the transmission system 1 is configured in the following manner: An ingress router R1 (corresponding to the ingress edge transfer device 10) is arranged at the ingress edge of an MPLS network, and an egress router R8 is arranged at the egress edge of the same. The ingress router R1 is connected to an IP network as well as to core routers R2 to R4 (corresponding to the core transfer devices 20) via respective links L1 to L3. Further, the egress router R8 is connected to core routers R5 to R7 via respective links L11 to L13.

Further, the core router R2 is connected to the core router R3 via a link L4, and the core router R5 via a link L6. The core router R3 is connected to the core router R6 via a link L7, and the core router R4 via a link L5. The core router R4 is connected to the core router R7 via a link L8. The core router R5 is connected to the core router R6 via a link L9, and the core router R6 is connected to the core router R7 via a link L10.

As to the transfer system 1 having the above network configuration, a label path leading from the ingress router R1 to the egress router R8 will be considered hereafter. There are a plurality of label paths which can be set between the ingress router R1 and the egress router R8, and the shortest label paths of them are the label paths LSP 1 to LSP 3 shown in FIG. 2. A transfer route for the label path LSP 1 is R1→R2→R5→R8, a transfer route for the label path LSP 2 is R1→R3→R6→R8, and a transfer route for the label path LSP 3 is R1→R4→R7→R8. Now, it is assumed that packets are transferred between the ingress router R1 and the egress router R8 by using the above label paths LSP 1 to LSP 3.

Next, fault recovery control according to the invention will be described. Let it be assumed that there has occurred a line fault in the link L7 on the FIG. 2 network. The routers R1 to R8 always monitor the states of the links, e.g. for occurrence of loss of light or the like.

Here, it is assumed that the core router R3 has detected the line fault caused in the link L7. Then, the fault message-notifying means 21 of the core router R3 floods a fault message all over the network by using a routing protocol, such as an OSPF (Open Shortest Path First). Further, the fault message-notifying means 21 notifies the ingress router R1 of the fact by utilizing a message of a signaling protocol, such as an RSVP (Resource Reservation Protocol).

After the ingress router R1 has received the fault message to be informed of (i.e. detect) a fault which has occurred in the label path, the ingress router R1 switches label paths. Now, the integer calculation means 11 and the path-setting means 12 will be described in more detail.

Figure 3:
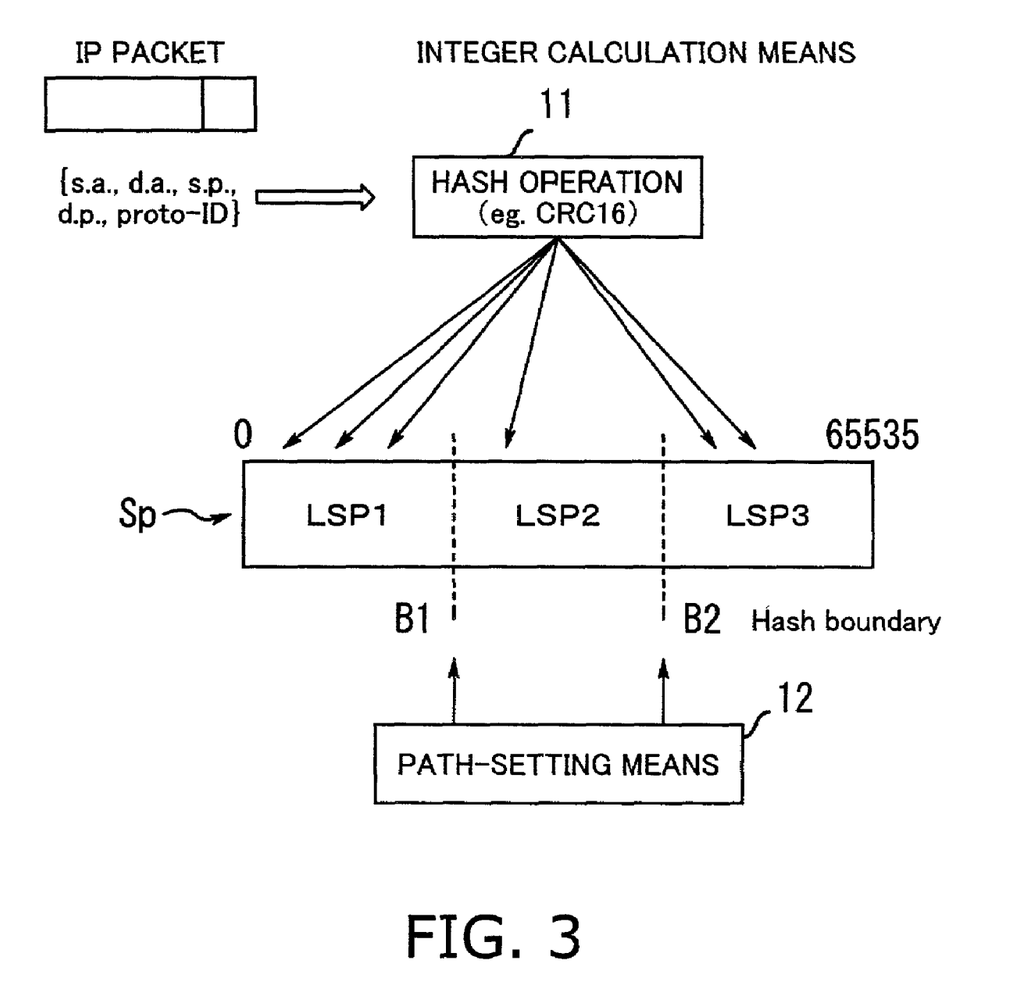
FIG. 3 is a diagram which is useful in explaining operations of integer calculation means and path-setting means.

FIG. 3 is a diagram which is useful in explaining operations of the integer calculation means 11 and the path-setting means 12. When the ingress router R1 receives an IP packet from the IP network, it calculates a hash function by the integer calculation means 11 thereof with flow information of the IP packet as a key for the calculation. In this calculation, a CRC (Cyclic Redundancy Check) 16 is used, for instance, which is a random function.

The flow information of the IP packet includes a source address (s.a.), a destination address (d.a.), a source protocol (s.p.), a destination protocol (d.p.), and a protocol ID (proto-ID), for instance.

When the flow information is used in the hash function calculation, only the source address (32 bits) or only the destination address (32 bits) may be used, or alternatively, a combination of a plurality of flow information items may be used as the key.

The integer calculation means 11 calculates a hash function (performs a hash operation) based on the above flow information to determine one integer corresponding to one input packet (this integer determines a label path where the corresponding IP packet should be mapped). As described above, space indicated by flow information of IP packets is assigned to a degenerate space (space between 0 and 65535 in the figure) Sp.

The path-setting means 12 divides the degenerate space formed of integers into sections by boundary values (hereinafter referred to as "hash boundaries"). The resulting sections correspond to respective label paths for transferring IP packets. For instance, in the case of FIG. 3, the degenerate space Sp is divided into three sections by using hash boundaries B1, B2. An IP packet corresponding to an integer in the section from 0 to B1 is transferred via the label path LSP1, an IP packet corresponding to an integer in the section from B1 to B2 is transferred through the label path LSP2, and an IP packet corresponding to an integer in the section from B2 to 65535 is transferred via the label path LSP3.

Therefore, in performing normal communication between the ingress router R1 and the egress router R8 by establishing the label paths LSP1 to LSP3 therebetween, if the hash boundaries B1, B2 are set such that the degenerate space Sp is equally divided into three sections, it is possible to make uniform the traffic loads on the respective label paths (it is possible to efficiently perform load balancing).

As described hereinabove, when no fault has occurred, a plurality of multi-label paths are used for the load balancing. Further, it is also possible to use one of the multi-label paths as a working path (for instance, the LSP1 may be used as the working path and the LSP2, LSP3 may be used as protection paths).

Figure 4:
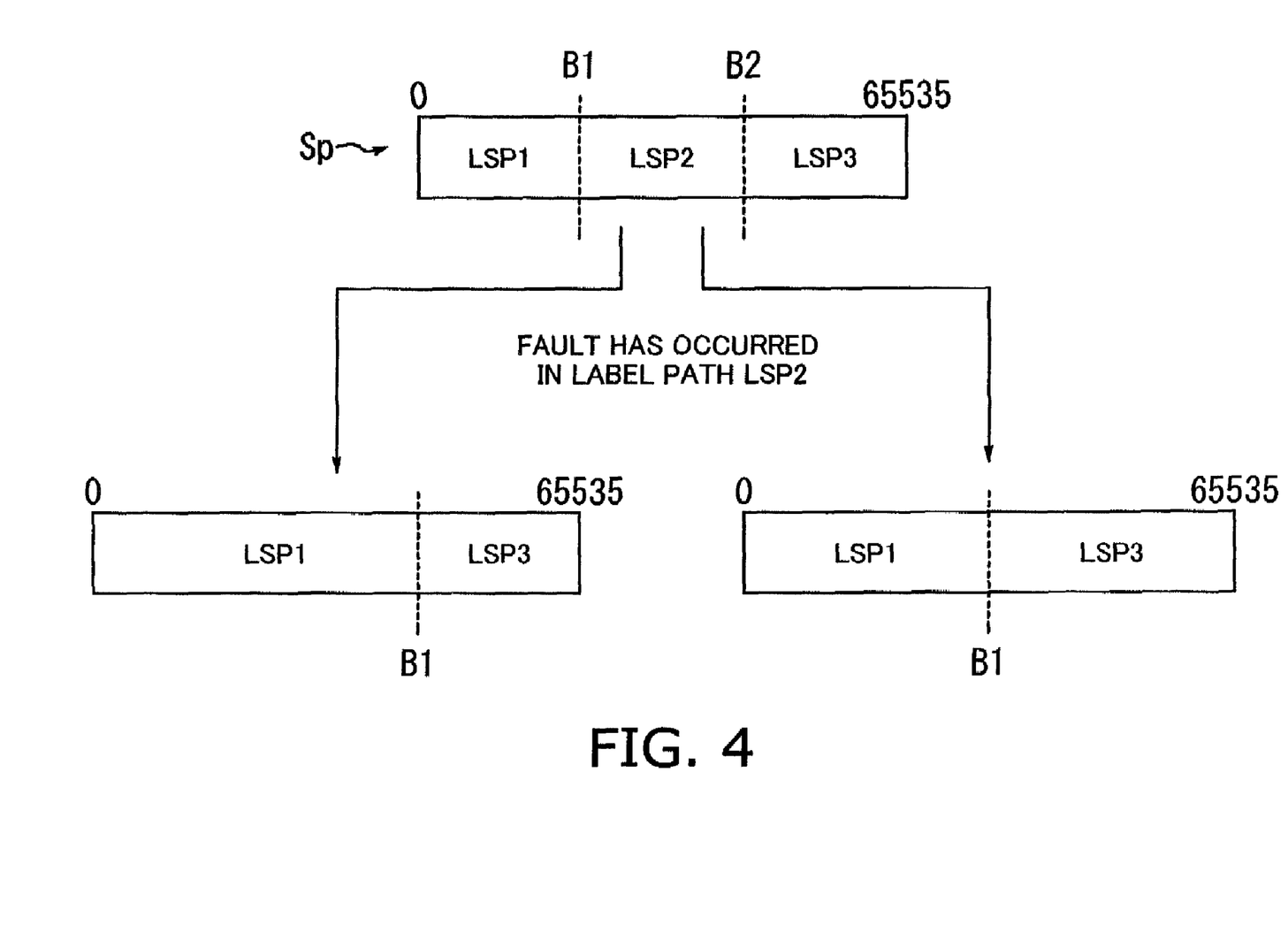
FIG. 4 is a diagram showing steps of adjusting hash boundaries to reset paths when a fault has occurred.

FIG. 4 shows steps of adjusting hash boundaries to reset the label paths when a fault has occurred. If a fault has occurred in the link L7, thereby making it impossible to use the label path LSP2, the path-setting means 12 shifts the hash boundary B1 to the position of the hash boundary B2 to thereby divide the degenerate space Sp into two sections and sets transfer paths for transferring IP packets to the label paths LSP1, LSP2. Alternatively, the path-setting means 12 shifts only the hash boundary B1 to a central position of the degenerate space Sp such that the degenerate space Sp can be equally divided into two sections.

As described above, according to the present invention, the hash boundary or boundaries is/are shifted, whereby it is possible to prevent an IP packet from flowing into the path where the fault has occurred, and at the same time flexibly adjust the load on the new path set for recovery of the fault. This makes it possible to prevent occurrence of the biased traffic to thereby perform efficient fault recovery control.

Further, if there is no hash boundary at the time point of occurrence of a fault, the path-setting means 12 searches for a fault recovery path to set the same to a new path. For instance, when only the label path LSP1 is established for communication between the ingress router R1 and the egress router R8, there is no hash boundary. Therefore, in such a case, if a fault (including a router fault or the like) is caused in a link through which the label path LSP1 extends, the path-setting means 12 searches for a new path to set a bypass path.

Further, although in the above description, the hash boundary or boundaries is/are adjusted such that traffic loads on the respective label paths are made uniform after execution of fault recovery, the hash boundary or boundaries may be set such that the band activity ratios of label paths free of a fault are constant.

For instance, when the capacity of the label path LSP1 is 10 Mb/s, 1 Mb/s of which is used (band activity ratio=1/10), the capacity of the label path LSP2 is 20 Mb/s, 3 Mb/s of which is used (band activity ratio=3/20), and the capacity of the label path LSP3 is 30 Mb/s, 6 Mb/s of which is used (band activity ratio=6/30=1/5), if a fault is caused in the label path LSP2, the hash boundaries are adjusted in the degenerate space Sp such that the band activity ratios of the label paths LSP1, LSP3 become 1/10 and 1/5, respectively, after execution of the fault recovery.

Further, the hash boundaries may be set such that the sections are proportional to bands which are assigned to the respective label paths in advance. For instance, when the label paths LSP1, LSP2, LSP3 have capacities of 10 Mb/s, 20 Mb/s, 30 Mb/s, respectively, (LSP1:LSP2:LSP3=1:2:3), if a fault is caused in LSP2, the hash boundaries are adjusted such that the sections in the degenerate space Sp for the label path LSP1 and the label path LSP3 become 1:3.

As described above, in the transmission system 1 according to the present invention, each of the core transfer devices 20 carries out notification of a fault message and label switching for packets, while the ingress edge transfer device 10 performs a hash operation based on flow information of each input packet to calculate an integer, and sets a packet-transferring path by classifying the integer into one of the sections divided by hash boundaries. Then, the ingress edge transfer device 10 adjusts boundary values when a fault message is received, or depending on the state of communication.

The above construction makes it possible to efficiently distribute the traffic load to respective paths set by the path-setting means 12, which enables the system to be improved in operating efficiency and perform efficient fault recovery control.

Figure 5:
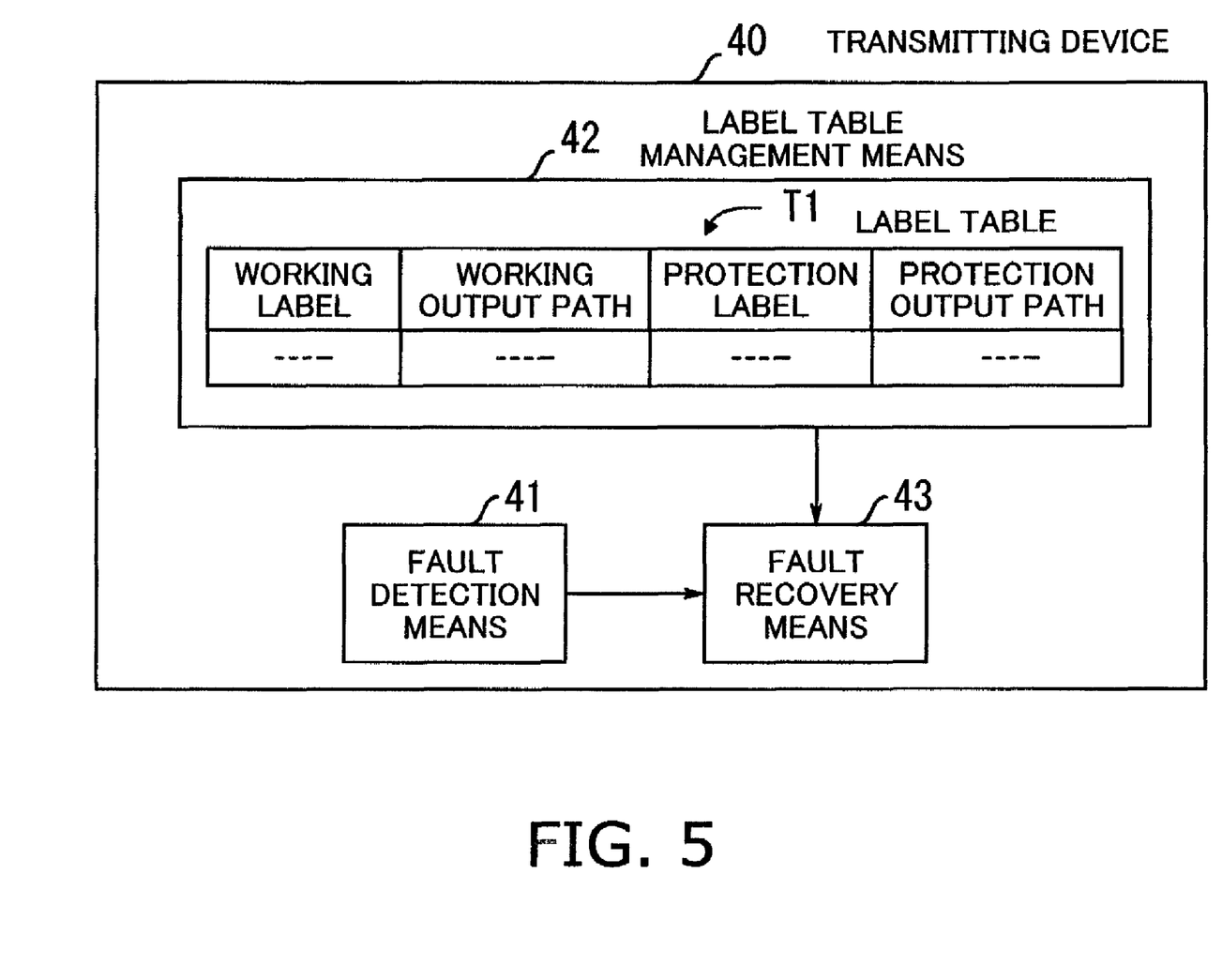
FIG. 5 is a block diagram illustrating the operating principles of a transmitting device according to the invention.

Next, a transmitting device according to the present invention will be described hereafter. FIG. 5 illustrates the operating principles of the transmitting device. Fault detection means 41 detects whether or not a fault has occurred in any of links connected to the transmitting device, and sets flags indicative of the results of the detection.

Label table management means 42 manages a label table T1 which is formed of working labels for input packets and working output paths corresponding to the respective working labels as well as protection labels and protection output paths corresponding to the respective protection labels, for fault recovery when a fault has occurred in any of the working output paths.

When the fault recovery means 43 recognizes occurrence of a fault in any of the working output paths from the states of the flags, it replaces a working label for each packet with a protection label based on the contents of the label table T1, and then transfers the packet via the protection output path.

Figure 6:
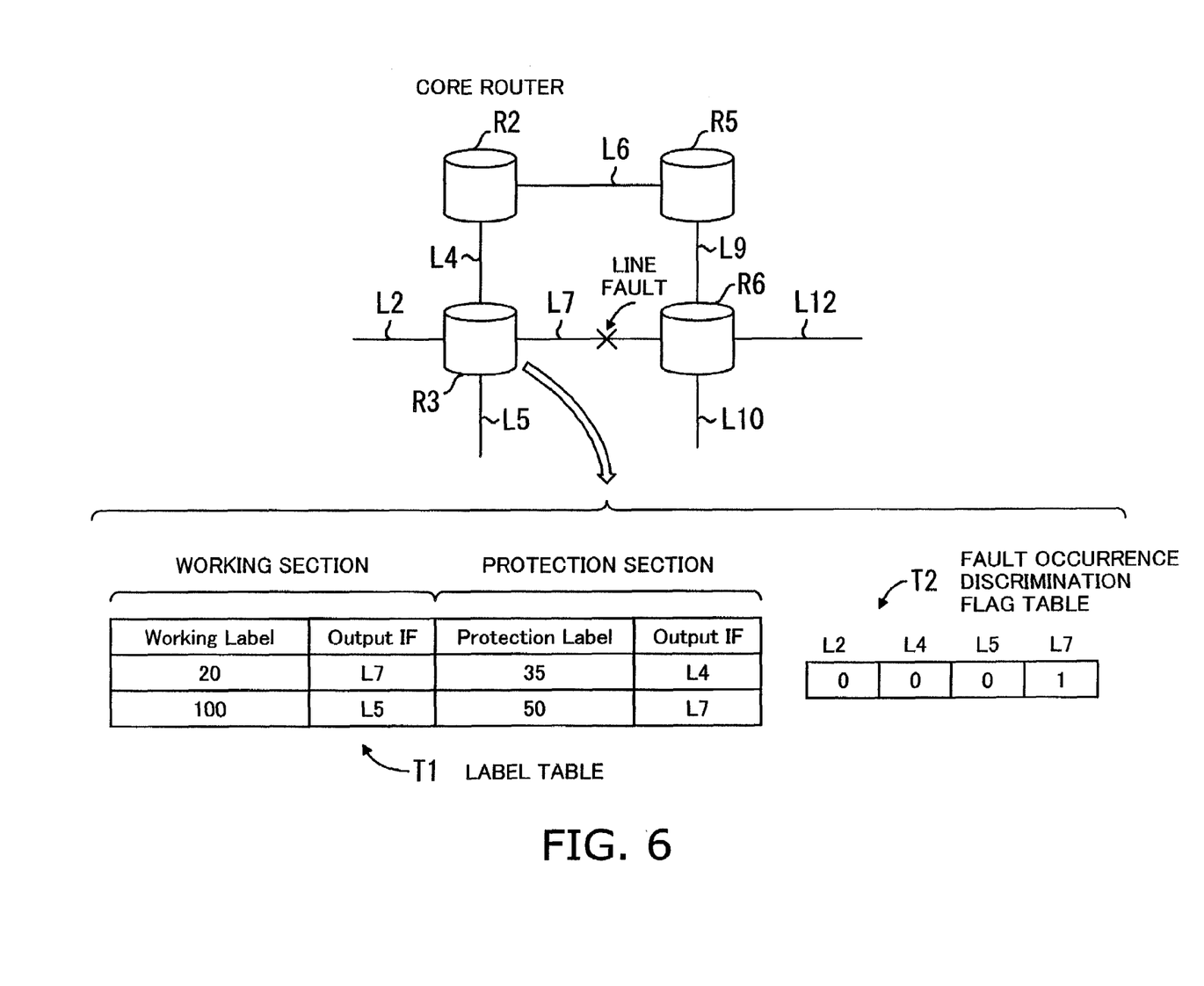
FIG. 6 is a diagram which is useful in explaining operations of the transmitting device.

Next, an application of the transmitting device 40 according to the present invention to the local repair method of MPLS will be described hereafter. FIG. 6 is a diagram which is useful in explaining operations of the transmitting device 40. The transmitting device 40 corresponds to a core router. Further, the illustrated network portion indicates part of the network whose configuration is shown in FIG. 2. In FIG. 6 are also shown a fault occurrence discrimination flag table T2 managed by the fault detection means 41 of the core router R3, and the label table Ti managed by the label table management means 42.

The fault detection means 41 detects whether or not there has occurred a fault in any of the links connected to the core router R3, and sets flags indicative of the results of the detection. In the figure, since a line fault has occurred in the link L7, the associated flag is set to "1" for the link L7 (flags for the other links are set to "0" since they have no failure occurring therein).

The label table T1 is divided into a working section for normal use which stores working labels and output IFs (corresponding to working output paths), and a protection section for use during occurrence of a fault, which stores protection labels and output IFs (corresponding to protection output paths).

In the illustrated example, a working label is set to 20 and an output IF associated therewith is set to L7, so that when receiving an IP packet with a label #20 added thereto, normally, the core router R3 would output the IP packet to the link L7. However, the fault occurrence discrimination flag table T2 enables the fault recovery means 43 to recognize that a fault has occurred in the link L7.

In accordance with the recognition, the fault recovery means 43 performs a fault-recovering operation by using a portion of the protection section corresponding to a row in the label table Ti in which the working label of 20 and output IF of L7 are set. More specifically, in the illustrated example a protection label is set to 35 and an output IF is set to L4 in the same row of the label table T1, the fault recovery means 43 replaces the label #20 added to the IP packet with a label #35, and outputs the IP packet via the link L4.

Figure 7:
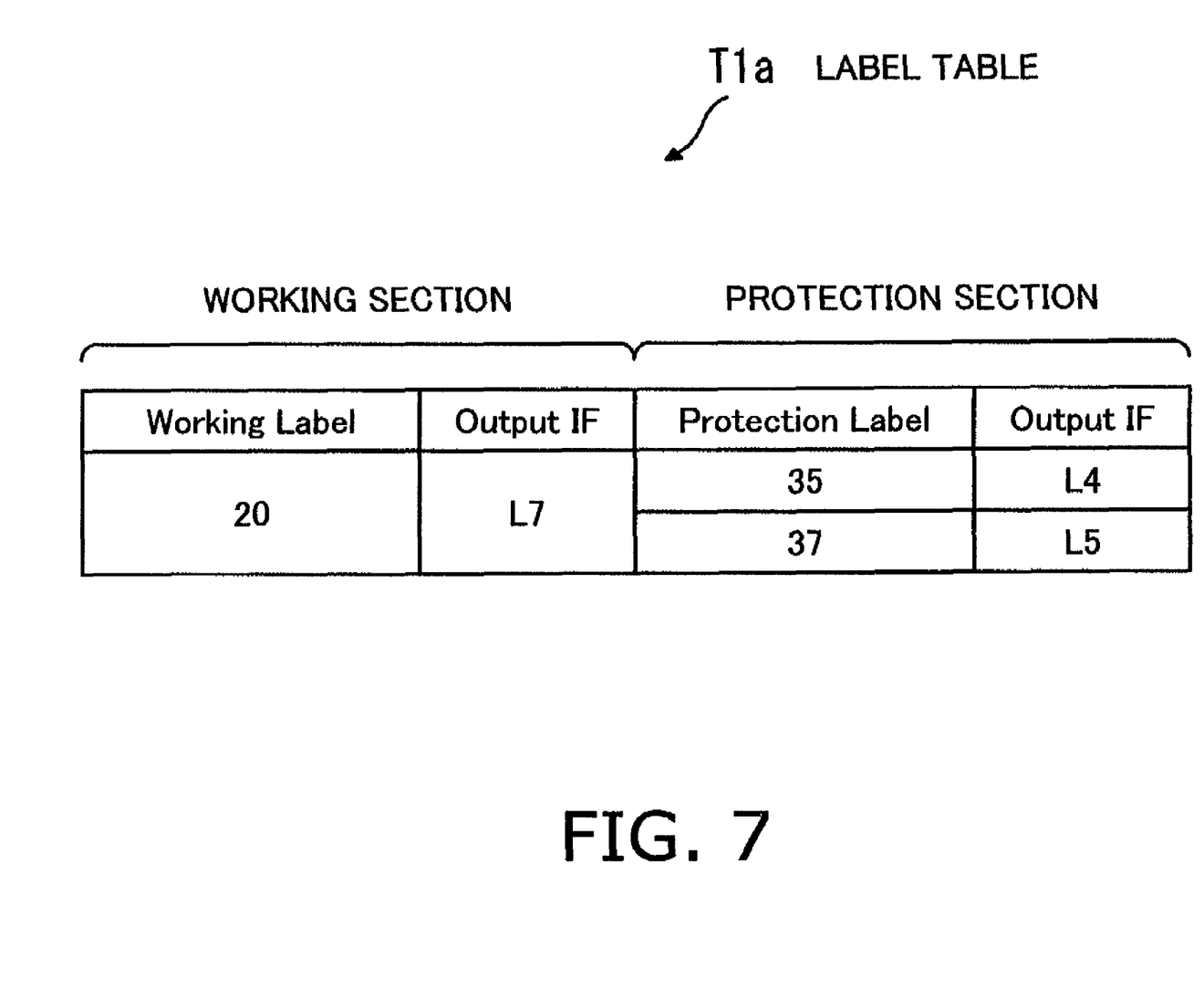
FIG. 7 is a table showing a variation of a label table.

FIG. 7 shows a label table T1$a$ which is a variation of the label table T1. The label table T1$a$ has a plural sets of fields for a protection section corresponding to a working section which is formed of one set of fields.

In the illustrated example, two sets of data, i.e. a protection label of 35 and an output IF of L4 as well as a protection label of 37 and an output IF of L5 are set in the protection section in association with the working section storing a working Label of 20 and an output IF of L7.

In case of a fault being caused in the link L7, the order of priority is given to selection of paths on an item-by-item basis. For instance, if the link L4 is shorter than the link L5, the fault recovery means 43 is configured to select the protection label of 35 and the output IF of L4, or the fault recovery means 43 may be configured such that it selects the protection label of 37 and the output IF of L5 if the link L5 has a larger free band than that of the link L4.

As described hereinabove, the transmitting device 40 according to the present invention is constructed such that the label table T1 has a section for working or normal use and a section for protection use correlated with each other in advance for management, and a fault is detected according to the states of flags to perform a fault-recovering operation based on the contents of the label table T1.

This configuration makes it possible to dispense with processing for search for a route bypassing the path in which the fault has occurred, at an end of the path, thereby shortening a processing time period required for recovering the fault.

As described hereinbefore, in the transmission system according to the present invention, each core transfer device performs notification of a fault message and label switching for packets. The ingress edge transfer device performs a function operation based on flow information of an input packet to calculate an integer, and sets a packet-transferring path based on sections classifying integers by boundary values. Then, the ingress edge transfer device adjusts the above boundary values when a fault message is received, or depending on the state of communication. This makes it possible to efficiently distribute traffic load to paths thus set, which enables the system to be improved in operating efficiency and perform efficient fault recovery control.

Further, the transmitting device according to the present invention is constructed such that fault recovery control is carried out by using flags indicative of whether or not a fault has occurred, and a table formed of working labels for input packets and working output paths corresponding to the respective working labels as well as protection labels and protection output paths corresponding to the respective protection labels. This makes it possible to dispense with processing for searching for a route bypassing a path in which a fault has occurred, thereby shortening a processing time period required for recovering the fault, which contributes to performing efficient fault recovery control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission system for carrying out control operations for recovering a fault, which has occurred, thereby performing transmission control, comprising:

a plurality of core transfer devices and an ingress edge transfer device;

wherein the core transfer devices are arranged in an MPLS network and the ingress edge transfer device is arranged at the ingress edge of the MPLS network and the ingress edge transfer device is connected to the core transfer devices via respective links;

the core transfer device including a fault message-notifying unit, a relay/transfer unit, a fault detection unit, a label table management unit and a fault recovery unit;

the ingress edge transfer device including an integer calculation unit, a path-setting unit and an ingress edge transfer unit;

(a) wherein, when a global repair control operation which is a path-end switching is chosen for recovering a fault, the fault message-notifying unit notifies, when a fault has occurred, a fault message including information of a location of occurrence of the fault to other devices;

the integer calculation unit performs a function operation based on flow information of an input packet to calculate one integer corresponding to one input packet;

the path-setting unit classifies the integer into one of sections of integers divided by boundary values to set the section as a path for transferring the input packet and adjusting the boundary values when the fault message is received, or depending on the state of communication;

the ingress edge transfer unit adds a label to the packet for transferring the packet via the set path; and the relay/transfer unit carries out label switching operation on the packet having the label added thereto, and relay/transfer of the packet;

wherein said path-setting unit adjusts the boundary values such that the band activity ratios of the paths free of a fault are constant, such that the sections are proportional to bands which are assigned to the respective paths in advance;

(b) wherein, when a local repair control operation which is a fault-end switching is chosen for recovering a fault, the fault detection unit detects whether or not a fault has occurred in any of paths connected to the core transfer device, and setting flags indicative of results of the detection;

the label table management unit manages a table which is formed of working labels for input packets and working output paths corresponding to the respective working labels as well as protection labels and protection output paths corresponding to the respective protection labels, for fault recovery when a fault has occurred in any of the working output paths; and the fault recovery unit replaces, when it is recognized from states of the flags that a fault has occurred in any of the working output paths, a working label for a packet with a protection label based on contents of the table, and transferring the packet via a corresponding one of the protection output paths;

wherein the fault recovery unit sets an order of priority for selection of the protection output paths, thereby selecting a path having a largest available bandwidth with a highest priority.

2. The transmission system according to claim 1, wherein when said fault message-notifying unit transmits the fault message, said fault message-notifying unit notifies the fault message either to an entire network by using a flooding function of a routing protocol or to said ingress edge transfer device by using a signaling protocol.

3. The transmission system according to claim 1, wherein if there are no boundary values at a time point of occurrence of the fault, said path-setting unit carries out path setting by searching for a fault recovery path.

* * * * *